United States Patent [19]

Thill et al.

[11] 4,422,668

[45] Dec. 27, 1983

[54] PASSIVE SAFETY DEVICE

[75] Inventors: Albert Thill, Weyhausen; Wolfgang Sukopp, Wolfsburg, both of Fed. Rep. of Germany

[73] Assignee: Volkswagenwerk Aktiengesellschaft, Wolfsburg, Fed. Rep. of Germany

[21] Appl. No.: 338,630

[22] Filed: Jan. 11, 1982

[30] Foreign Application Priority Data

Feb. 15, 1981 [DE] Fed. Rep. of Germany ....... 3105480

[51] Int. Cl.³ .............................................. B60R 21/10
[52] U.S. Cl. .................................... 280/804; 280/808; 297/469
[58] Field of Search ............... 280/801, 802, 804, 807, 280/808; 297/469, 473

[56] References Cited

U.S. PATENT DOCUMENTS 4,272,104 6/1981 Cuny .................................... 280/808
4,311,323 1/1982 Provensal ............................ 280/808

FOREIGN PATENT DOCUMENTS 2704145 8/1978 Fed. Rep. of Germany ...... 280/804
2388569 11/1978 France ................................ 280/801

Primary Examiner—Joseph F. Peters, Jr.
Assistant Examiner—Ross Weaver
Attorney, Agent, or Firm—Brumbaugh, Graves, Donohue & Raymond

[57] ABSTRACT

A passive safety device for vehicles has a safety belt with at least one upper end associated with the shoulder of the vehicle occupant. This upper end of the safety belt is connectable by a manually-operable belt lock with a shackle. The shackle is held on a slide which can be displaced in a guide rail held on the vehicle body between a release position and a restraining position. The slide can be locked in the restraining position in a receiving means fixed on the vehicle body by a spring-loaded locking latch. If the slide becomes stuck at a position remote from the restraining position, the vehicle occupant can be protected by manually inserting into the receiving means one end of an emergency lock insertion shackle carried separately in the vehicle, and by fastening the belt lock to the other end of the insertion shackle.

2 Claims, 1 Drawing Figure

U.S. Patent  Dec. 27, 1983  4,422,668
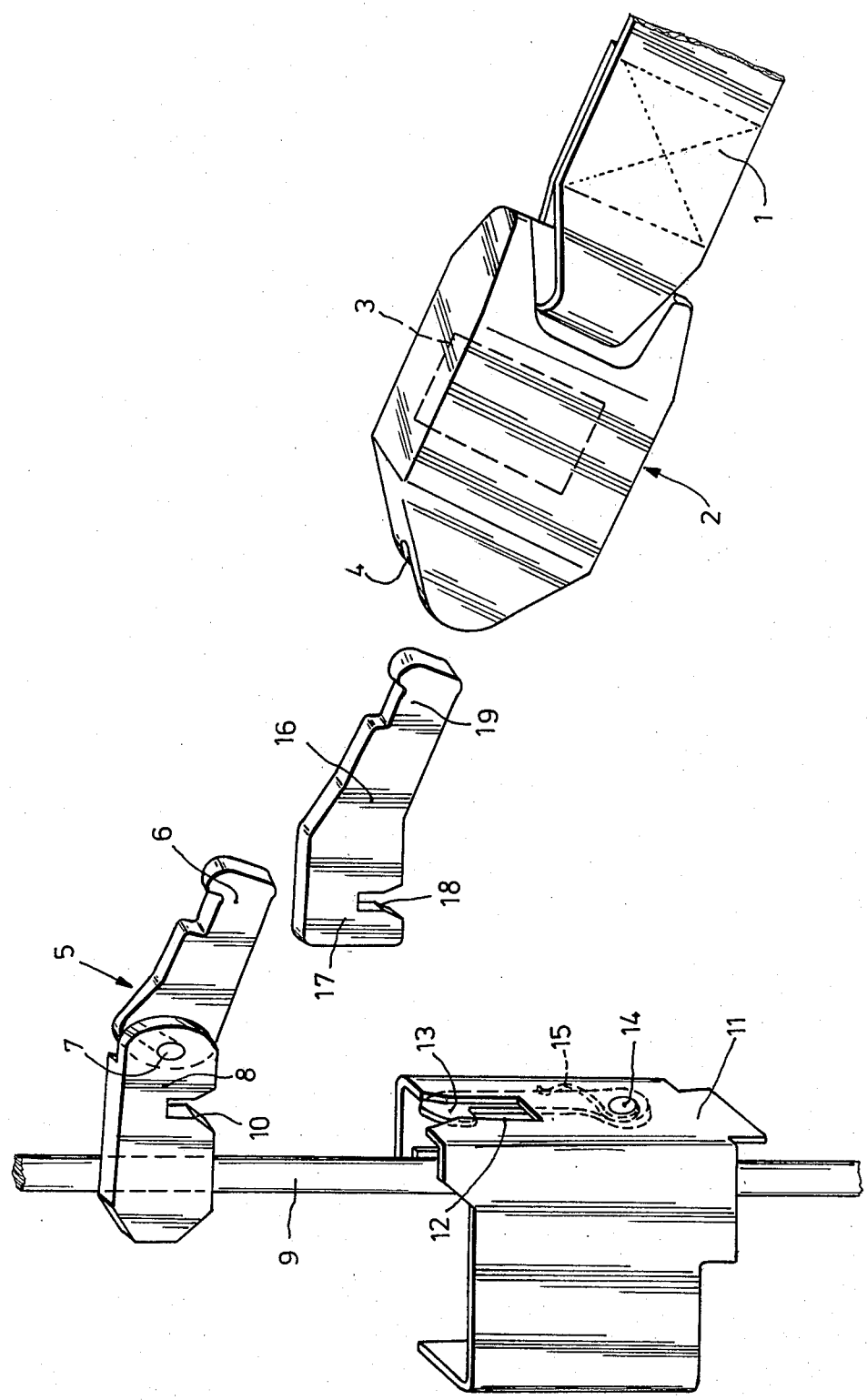

PASSIVE SAFETY DEVICE

BACKGROUND OF THE INVENTION

The present invention relates to a passive safety device for vehicles and, more particularly, to a passive safety device for passenger automobiles which includes a shoulder safety belt that is automatically moved between a restraining position about the body of an occupant and a release position upon movement of the vehicle door.

There are known passive safety devices having a safety belt with at least one upper end associated with the shoulder of a vehicle occupant and connected with a slide displaceable in a guide on the vehicle body. The slide in such a known device is displaceable by a drive as a function of the position of the adjacent vehicle door between a release position and a restraining position. In the release position, the safety belt is arranged to facilitate unobstructed access to the vehicle seat. In the restraining position, the belt safety holds the vehicle occupant on the vehicle seat. The essential advantage of such passive safety devices is that during the operation of the vehicle the passengers need not actively apply the safety belt. This type of connection avoids unintentional or intentional non-application of the safety belt.

However, if a breakdown of the slide drive or a jamming of the slide in the guide occurs during the operation of the vehicle, the safety belt fastener no longer attains the restraining position so that the safety of the passenger is no longer ensured.

SUMMARY OF THE INVENTION

It is an object of the present invention to provide at least a stop-gap means for securing the vehicle occupant with a safety belt so that the occupant can protect himself from injury if he continues to operate the vehicle after its passive restraint safety device has become defective. This purpose is attained in accordance with the invention by providing a device or shackle that is freely carried in the vehicle, but which is insertable into a stationary part of the belt guide of the passive restraint so as to provide a connection point for the belt lock.

In an illustrative embodiment of the invention a passive safety belt for a passenger vehicle includes a safety belt with an end associated with the shoulder of a vehicle occupant which end is connected to a shackle held on a slide. The slide is displaceable in a guide rail held on the vehicle body between a release position allowing access to the vehicle seat associated with the safety belt and a restraining position in which the safety belt holds an occupant on the seat. When in the restraining position the slide is locked in a receiving means. This basic arrangement is improved according to the invention by providing a lock insertion shackle separately storable in the vehicle, which, on failure of the slide displacement, can have one end locked in the receiving means and the other end fixed on the safety belt end associated with the occupant's shoulder. Thus, in case of an emergency, the lock insertion shackle, which may be fixed removably to the veicle, e.g. to the inside of a glove compartment cover, can be introduced by the passenger into the receiving means and locked there and the belt can be fixed to it. Although the passivity of the safety system, i.e. its automatic operation, is suspended by use of the lock insertion shackle, the vehicle occupant is nevertheless secured sufficiently in case of an emergency.

BRIEF DESCRIPTION OF THE DRAWING

The foregoing and other features of an illustrative embodiment of the invention will be described in detail in conjunction with the accompanying drawing, which drawing shows a schematic plan view of the restraining region of the belt guide of a passive safety device and an emergency lock insertion shackle.

DESCRIPTION OF AN ILLUSTRATIVE EMBODIMENT

In the drawing there is shown a safety belt that includes, e.g., a diagonal shoulder belt 1 with a locking device 2 fixed at one end of the belt. The locking device 2 is operable by a push button 3. The other end of the safety belt, which is not shown, is fastened to the vehicle floor on the side of a vehicle seat remote from the vehicle door. This attachment is generally in the pelvic zone of a vehicle occupant seated on the vehicle seat. Interposed between this belt end and its attachment to the vehicle may be a conventional belt winding arrangement. A shackle portion 6 which is part of a slide 5 is insetable into an opening 4 of the locking device 2 and together they form a locking mechanism. The shackle 6 is fastened in a force transmitting manner to a guide part 8 by means of a bolt connection 7. Slide 5 is displaceably held in a guide on the vehicle frame above the door opening adjacent to the vehicle seat, not shown here, e.g. by means of a pressure and traction-resistant cable 9.

In a location of the slide guide associated with the restraining position of the safety belt, there is fixed on the vehicle body a receiving means 11. The receiving means 11 has a locking slit 12. On displacement of the slide 5 into the restraining position the guide part 8 of the slide enters receiving means 11 such that a funnel-shaped clearance 10 of the guide part 8 is engaged in the locking slit 12 of the receiving means. A locking latch 13 pivoting, e.g. on the inside of the front plate of the receiving means 11, then grips the guide part 8 on its upper edge and locks it in the receiving means. Towards this end the locking latch 13 pivots about a fixing point 14 and is loaded in the direction of engagement by a spring 15.

For moving the slide back from the aforedescribed restraining position, devices (not shown) are provided on the displacement cable 9 for interacting with the locking latch 13 when the displacement cable 9 is displaced in the reverse direction, so as to move the latch contrary to the spring force, thereby disengaging the latch so the guide can slide out of the restraining means 11.

To ensure that the passenger can be secured on the vehicle seat upon the failure of the slide displacement, an emergency lock insertion shackle 16 is carried separately in the vehicle. One end 17 of the lock insertion shackle is provided with a funnel-shaped receiving clearance 18 comparable to the receiving clearance 10 of the guide part 8. This clearance is adapted to engage the locking slit 12 of the receiving means 11 in the same manner that clearance 10 does when the automatic slide displacement is operational. The other end 19 of the lock insertion shackle 16 corresponds to the shackle portion 6 and can be introduced into the opening 4 of the belt lock 2 to interlock with same.

Thus, if the slide displacement fails, a passenger can retrieve th emergency lock insertion shackle, which may be removably fastened, e.g., on the inside of the glove compartment cover, and can manually introduce it into the locking slit 12 of the receiving means 11 where it is secured by the locking latch 13. Thereafter the belt lock 2 can be fastened on the end 19 of the emergency lock insertion shackle that protrudes from the receiving means 11.

Release of the emergency insertion shackle from the receiving means can then be obtained only by pushing back the locking latch 13, which can be done, generally speaking, only in a workshop. At such a workshop, however, the reason for the failure of the slide displacement can also be remedied. To provoke a visit to a workshop, the emergency insertion lock shackle 16 can be shaped in such a manner that between said shackle, the belt lock 2 and the receiving means 11, the tolerances are relatively large so that during operation of the vehicle, rattling noises are produced which annoy the rider.

While the invention has been particularly shown and described with reference to a preferred embodiment thereof, it will be understood by those skilled in the art that various changes in form and details may be made therein without departing from the spirit and scope of the invention.

We claim:

1. A passive safety device for vehicles, for example passenger automobiles, has a safety belt with at least one upper end associated with the shoulder of a vehicle occupant, said upper end being connectable by means of a manually-operable belt lock to a shackle held on a slide which can be displaced by a guide means between a release position and a restraining position, when in the restraining position said slide can be locked in a receiving means fixed on the vehicle body by means of a spring-loaded locking latch, characterized in that there is provided a lock insertion shackle carried separately in the vehicle, one end of said lock insertion shackle being connectable with the belt lock and its other end being engageable in the receiving means.

2. A passive safety device as claimed in clam 1, characterized in that the lock insertion shackle is removably fixed on the inside of a glove compartment cover provided on the vehicle.

* * * * *